United States Patent
Gabe et al.

(10) Patent No.: US 8,056,321 B2
(45) Date of Patent: Nov. 15, 2011

(54) EXHAUST GAS PURIFICATION METHOD AND EXHAUST GAS PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 610 days.

(21) Appl. No.: 12/224,876

(22) PCT Filed: Apr. 9, 2007

(86) PCT No.: PCT/JP2007/057811
§ 371 (c)(1),
(2), (4) Date: Sep. 9, 2008

(87) PCT Pub. No.: WO2007/123011
PCT Pub. Date: Nov. 1, 2007

(65) Prior Publication Data
US 2009/0056314 A1    Mar. 5, 2009

(30) Foreign Application Priority Data
Apr. 10, 2006  (JP) .................................. 2006-107172

(51) Int. Cl.
*F01N 3/00*  (2006.01)
(52) U.S. Cl. ............... 60/285; 60/274; 60/286; 60/295; 60/299
(58) Field of Classification Search ............ 60/274, 60/285–287, 295–301
See application file for complete search history.

(56) References Cited

U.S. PATENT DOCUMENTS

| | | | |
|---|---|---|---|
| 5,497,619 A | 3/1996 | Yamada et al. | |
| 5,701,736 A * | 12/1997 | Morishima et al. | 60/297 |
| 5,937,637 A * | 8/1999 | Fujishita et al. | 60/274 |
| 6,185,933 B1 | 2/2001 | Tsuzuki et al. | |
| 6,301,887 B1 | 10/2001 | Gorel et al. | |
| 6,367,245 B1 * | 4/2002 | Yasui et al. | 60/277 |
| 6,634,345 B2 * | 10/2003 | Yoshizaki et al. | 123/568.12 |
| 2006/0016180 A1 * | 1/2006 | Tomita et al. | 60/297 |

FOREIGN PATENT DOCUMENTS

| | | |
|---|---|---|
| JP | 06-066208 | 3/1994 |
| JP | 6-93840 | 4/1994 |
| JP | 7-71230 | 3/1995 |
| JP | 8-189342 | 7/1996 |

(Continued)

OTHER PUBLICATIONS

International Search Report (mailed Jul. 24, 2007 for International Application No. PCT/JP2007/057811).

(Continued)

*Primary Examiner* — Thomas Denion
*Assistant Examiner* — Jesse Bogue
(74) *Attorney, Agent, or Firm* — Staas & Halsey LLP

(57) ABSTRACT

An exhaust gas purification system provided with an exhaust gas purification device, such as a NOx occlusion-reduction catalyst, in an exhaust passage of an internal combustion engine for purifying exhaust gas when the air-fuel ratio of the exhaust gas is in a lean state, and recovering purification ability when in a rich state. The system prevents highly dense, uncombusted fuel from acting as a binder that causes soot, together with the uncombusted fuel, to clog an EGR cooler in an EGR passage. An uncombusted fuel adsorption device for adsorbing uncombusted fuel is provided upstream of the EGR cooler for adsorbing uncombusted fuel passing through the EGR passage during a rich control.

20 Claims, 3 Drawing Sheets

FOREIGN PATENT DOCUMENTS

| | | |
|---|---|---|
| JP | 11-82111 | 3/1999 |
| JP | 2000-2138 | 1/2000 |
| JP | 2000-38962 | 2/2000 |
| JP | 2003-535264 | 11/2003 |
| JP | 2004-162552 | 6/2004 |
| JP | 2005-16387 | 1/2005 |
| JP | 2005-016390 | 1/2005 |

OTHER PUBLICATIONS

Patent Abstracts of Japan, Publication No. 06-066208, Published Mar. 8, 1994.
Patent Abstracts of Japan, Publication No. 2005-016390, Published Jan. 20, 2005.

* cited by examiner

EXHAUST GAS PURIFICATION METHOD AND EXHAUST GAS PURIFICATION SYSTEM

CROSS REFERENCE TO RELATED PATENT APPLICATIONS

This application claims the benefit under 35 U.S.C. Section 371, of PCT International Application No. PCT/JP2007/057811, filed Apr. 9, 2007, which claimed priority to Japanese Application No. 2006-107172, filed Apr. 10, 2006, in the Japanese Patent Office, the disclosures of which are hereby incorporated by reference.

TECHNICAL FIELD

The present invention relates to an exhaust gas purification method and an exhaust gas purification system that requires temporary enrichment of the air-fuel ratio of exhaust gas of a NOx occlusion-reduction catalyst that purifies NOx present in the exhaust gas of an internal combustion engine.

BACKGROUND ART

Every year, emissions regulations are becoming stricter with regard to substances exhausted from diesel engines, such as particulate matter (PM), nitrogen oxides (NOx), carbon monoxide (CO), and hydrocarbons (HC). As these regulations become stricter, it is becoming difficult to meet the stipulated values by engine improvement alone. Consequently, technology is being adopted wherein an exhaust gas post-treatment device is installed in the exhaust passage of the engine to reduce these substances exhausted from the engine.

In such circumstances, various research and proposals have been made regarding NOx catalysts for the elimination by reduction of NOx from the exhaust gas of internal combustion engines, such as diesel engines and some gasoline engines, and various combustion devices. One of these catalysts is a NOx occlusion-reduction catalyst that acts as a NOx-lowering catalyst for diesel engines. With the use of this NOx occlusion-reduction catalyst, NOx in exhaust gas can be effectively purified.

This NOx occlusion-reduction catalyst is constructed as a monolith honeycomb that forms a large number of polygonal cells on a support body of structural material formed using cordierite, silicon carbide (SiC), or stainless steel. Provided on the walls of these cells is a porous catalyst coat layer formed using alumina ($Al_2O_3$) that acts as the catalyst-carrying layer. The catalyst coat layer carries on its surface a noble metal catalyst having oxidation functions, as well as a NOx occluding agent (NOx occluding substance; NOx occluder; NOx absorber) having NOx-occluding functions. The noble metal catalyst is formed using platinum (Pt) or a similar metal. The NOx occluding agent is formed from several among the following: alkali metals, such as potassium (K), sodium (Na), lithium (Li), and cesium (Cs); alkali earth metals, such as barium (Ba) and calcium (Ca); and rare earth metals, such as lanthanum (La) and yttrium (Y). In so doing, the two functions of NOx occlusion and NOx release/purification are realized depending on the oxygen concentration in the exhaust gas.

This NOx occlusion-reduction catalyst occludes NOx to the NOx occluding agent during regular engine operation. When the occluding ability of the NOx occlusion-reduction catalyst nears saturation, the air-fuel ratio of exhaust gas flowing into the NOx occlusion-reduction catalyst is brought to a rich air-fuel state at an appropriate time, thereby causing occluded NOx to be released. Additionally, the released NOx is reduced by the three-way function of the noble metal catalyst.

More specifically, when the air-fuel ratio of exhaust gas is in a lean air-fuel state, such as the oxygen ($O_2$)-containing exhaust gas of regular diesel engines and lean combustion gasoline engines, nitrogen monoxide (NO) exhausted from the engine is oxidized to nitrogen dioxide ($NO_2$) by the oxidation catalyst functions of the noble metal catalyst using the oxygen present in the exhaust gas. Subsequently, this nitrogen dioxide is occluded in the form of a salt such as nitrate by a NOx occluding agent such as barium, thus purifying the NOx.

However, if this state is continued as-is, the NOx occluding agent having NOx occluding ability will be entirely transformed into nitrate, and NOx occlusion functions will be lost. Consequently, exhaust gas with an exceedingly high concentration of fuel (rich spike gas) is created by changing the operational parameters of the engine or by injecting fuel into the exhaust passage, and this rich spike gas is then sent to the catalyst. The rich spike gas is a high-temperature exhaust gas having a high concentration of carbon monoxide (CO), and wherein oxygen is not present.

When the exhaust gas is thus brought to a rich air-fuel state wherein oxygen is not present, wherein there is a high concentration of carbon monoxide, and wherein the exhaust gas temperature has been raised, the nitrate formed by the occlusion of NOx releases nitrogen dioxide and returns to the original barium or other catalyst substance. Since oxygen is not present in the exhaust gas, the released nitrogen dioxide is reduced to nitrogen ($N_2$) and purified by the oxidation functions of the supported noble metal, using the carbon monoxide, hydrocarbons (HC), and hydrogen ($H_2$) present in the exhaust gas as reducing agents.

For this reason, a NOx regeneration operation is conducted in NOx purification systems provided with a NOx occlusion-reduction catalyst, in order to make the NOx occlusion-reduction catalyst function effectively. In this NOx regeneration operation, when NOx occluding ability nears saturation, the amount of fuel in the exhaust gas is raised beyond the theoretical air-fuel ratio, thereby bringing the exhaust gas to a rich air-fuel state in order to cause occluded NOx to be released and regenerate the catalyst. In so doing, the oxygen concentration of inflowing exhaust gas is decreased, and exhaust gas of a reducing composition is supplied to the catalyst. By conducting this rich control for recovering NOx occluding ability, the NOx absorbed by the NOx occluding agent is released. The released NOx is then reduced by the noble metal catalyst.

In addition, a rich control for recovering NOx reducing ability is conducted for NOx direct reduction type catalysts, a type of catalyst different from NOx occlusion-reduction catalysts. In a NOx direct reduction type catalyst, NOx is directly reduced in the lean state, while the catalyst is regenerated in the rich state. In addition, a rich control is also conducted in continuous regeneration DPF devices in order eliminate by combustion soot (PM) trapped at the filter.

In this rich control, it is necessary to supply the sufficient required amounts of reducing agent and uncombusted fuel, which is used as fuel for raising the exhaust gas temperature. In a diesel engine, in order to generate reducing exhaust gas, reducing agent HC is supplied by post-injection (after-injection) as part of an in-cylinder fuel injection. If the rich state is realized using only a fuel-related rich control wherein such fuel is added, fuel efficiency worsens, and drivability also worsens due to torque variations. For this reason, an intake-related rich control is used in conjunction with the above. In this intake-related rich control, air intake is throttled using an intake throttle valve, while in addition an exhaust gas recirculation ("EGR") valve is opened and a large amount of EGR gas is supplied. In so doing, the amount of intake air is reduced and the amount of inspired oxygen is lessened.

However, conducting such an intake-related rich control involves the following problem. During the rich control period wherein the EGR ratio is high, if exhaust gas containing highly dense uncombusted fuel (HC) is made to pass through the EGR passage, then uncombusted fuel and soot adhere to the EGR cooler and EGR valve of the EGR passage, as well as to the intake port and intake valve. The EGR cooler farthest upstream in particular becomes clogged in a short amount of time. For this reason, the intake-related rich control becomes impeded, and a sufficient rich control becomes unavailable.

As a countermeasure for such clogging of the EGR cooler, exhaust gas recirculation devices for diesel engines have been proposed such as that disclosed in Japanese Patent Application Kokai Publication No. H6-66208, for example, being an exhaust gas recirculation device for a diesel engine provided with a particulate trap and an oxidation catalyst layer downstream thereto in the EGR gas recirculation passage. With this device, not only soot but also uncombusted hydrocarbons in the EGR gas recirculation passage are eliminated, and the adherence and accumulation of these substances at the intake port and intake valve is prevented.

In addition, exhaust gas recirculation devices for internal combustion engines have been proposed such as that disclosed in Japanese Patent Application Kokai Publication No. 2005-16390, wherein an electric heater, particulate filter, EGR cooler, and EGR valve are disposed in that order from the upstream side of the recirculation passage. The state (on/off) of current flow to the electric heater is then switched on the basis of the temperature downstream to the particulate filter. With this device, clogging of the cooling device in the recirculation passage (EGR passage) due to particulates is suppressed. The particulate filter is also made to function effectively and without blockage, even under conditions wherein the temperature of exhaust (EGR gas) flowing into the EGR passage is low.

These devices have the following problem. Since soot (PM) is trapped by a particulate filter (or trap) and uncombusted hydrocarbons are eliminated by oxidation using an oxidation catalyst, it is necessary to regenerate the particulate filter from soot accumulation. This soot occurs not only during the rich control, but also during the lean control, and thus the particulate filter regeneration control must be conducted frequently, which leads to a more complicated control and worsened fuel efficiency.

Meanwhile, through experiment and other means, the present inventors have discovered that uncombusted fuel acts as a binder that causes soot, together with the uncombusted fuel, to adhere to the EGR cooler and other areas in the EGR passage. Furthermore, the inventors have discovered that there is hardly any adherence to the EGR cooler, EGR valve, intake port, intake valve, and other areas in the case of only dry soot that does not contain uncombusted fuel. Such dry soot reaches the interior of the cylinders and is purified by combustion.

SUMMARY OF THE INVENTION

Having obtained the above findings, the present invention was devised in order to solve the above problem. The objective of the present invention is to provide an exhaust gas purification method and an exhaust gas purification system provided with an exhaust gas purification device, such as a NOx occlusion-reduction catalyst, in the exhaust passage of an internal combustion engine, the exhaust gas purification device purifying exhaust gas when in a lean state and recovering purification ability when in a rich state. The exhaust gas purification method and exhaust gas purification system of the present invention can prevent clogging in the rich state due to highly dense uncombusted fuel acting as a binder that causes soot, together with the uncombusted fuel, to adhere to an EGR cooler in an EGR passage.

The exhaust gas purification method of the present invention that achieves the above object is provided with an exhaust gas purification device in the exhaust passage of an internal combustion engine, the exhaust purification device purifying exhaust gas when the air-fuel ratio of the exhaust gas is in a lean state, and recovering purification ability when in a rich state. Additionally, the exhaust gas purification method conducts a rich control in order to bring the air-fuel ratio of exhaust gas to a rich state, the rich control including a fuel-related rich control that supplies uncombusted fuel to the exhaust gas, and an intake-related rich control that includes EGR. In the method, during the rich control, uncombusted fuel in the exhaust gas that passes through the EGR passage is adsorbed by an uncombusted fuel adsorption device provided upstream to the EGR cooler.

It should be appreciated that the rich state of exhaust gas referred to herein does not necessarily mean rich combustion in-cylinder. Rather, the rich state herein refers to states wherein the ratio of air and fuel (including fuel combusted in-cylinder) that is supplied to exhaust gas flowing into the NOx occlusion-reduction catalyst is near the theoretical air-fuel ratio, or, wherein the amount of fuel is greater than in the theoretical air-fuel ratio.

With this method, the highly dense, uncombusted fuel supplied to exhaust gas during the rich control is adsorbed by an uncombusted fuel adsorption device anterior to the EGR cooler, the uncombusted fuel adsorption device being formed using an HC adsorption agent such as zeolite or silica (silicon dioxide: $SiO_2$). For this reason, uncombusted fuel can be prevented from acting as a binder that causes soot to adhere to the EGR cooler, and thus clogging of the EGR cooler can be prevented.

In addition, in the exhaust gas purification method, an adsorption tolerance amount for the uncombusted fuel adsorption device as well as a cumulative adsorption amount of uncombusted fuel adsorbed by the uncombusted fuel adsorption device, are calculated. It is then determined whether or not the cumulative adsorption amount exceeds the adsorption tolerance amount, and if so, rich control is preferably suspended or terminated. In so doing, the supplying of uncombusted fuel to the EGR passage that exceeds the adsorption tolerance amount of the uncombusted fuel adsorption device can be prevented. For this reason, clogging of the EGR cooler can be more reliably prevented. The adsorption tolerance amount of uncombusted fuel varies according to the temperature of the uncombusted fuel adsorption device. Consequently, it is preferable to provide exhaust gas temperature measuring means that measure the temperature of exhaust gas flowing into the uncombusted fuel adsorption device, and to calculate the adsorption tolerance amount of the uncombusted fuel adsorption device on the basis of the temperature of exhaust gas flowing into the uncombusted fuel adsorption device. In so doing, the adsorption tolerance amount can be more accurately calculated.

Furthermore, in the exhaust gas purification method, a release amount of uncombusted fuel is preferably calculated for the lean state after suspending the rich control. The release amount is successively subtracted from the cumulative adsorption amount, and when the cumulative adsorption amount after subtraction becomes smaller than a predetermined adsorption amount for judgment, it is preferable to resume the rich control. In so doing, each rich control can be fully completed. For this reason, the interval between rich controls when resuming becomes a smaller amount of time compared to that of a control that waits until the next rich control is requested. As a result, the fuel consumption involved in raising the temperature of the exhaust gas purification device can be lessened. Since the release amount of uncombusted fuel also varies according to the temperature of the uncombusted fuel adsorption device, the adsorption tolerance amount of the uncombusted fuel adsorption device is preferably calculated on the basis of the temperature of exhaust gas flowing into the uncombusted fuel adsorption device. In so doing, the adsorption tolerance amount can be more accurately calculated.

There is also a method that waits until the next rich control is requested without resuming the rich control. In the case of this method, uncombusted fuel that has accumulated at the uncombusted fuel adsorption device during the comparatively long lean combustion period is released in the lean state. At this point, since the oxygen concentration of the exhaust gas is high, the uncombusted fuel is completely eliminated by combustion. For this reason, the control pertaining to the uncombusted fuel adsorption device is simplified.

In addition, an exhaust gas purification system of the present invention that achieves the above objective is provided with an exhaust gas purification device in the exhaust passage of an internal combustion engine, the exhaust purification device purifying exhaust gas when the air-fuel ratio of the exhaust gas is in a lean state, and recovering purification ability when in a rich state. Additionally, the exhaust gas purification system is provided with a control device that conducts a rich control in order to bring the air-fuel ratio of exhaust gas to a rich state, the rich control including a fuel-related rich control that supplies uncombusted fuel to the exhaust gas, and an intake-related rich control that includes EGR. In the system, an uncombusted adsorption device that adsorbs uncombusted fuel is provided upstream to an EGR cooler in an EGR passage.

In addition, in the above exhaust gas purification system, the control device calculates both an adsorption tolerance amount for the uncombusted fuel adsorption device as well as a cumulative adsorption amount of uncombusted fuel adsorbed by the uncombusted fuel adsorption device. The control device is configured to determine whether or not the cumulative adsorption amount exceeds the adsorption tolerance amount, and if so, the rich control is suspended or terminated. In this case, it is preferable to provide exhaust gas temperature measuring means that measures the temperature of exhaust gas flowing into the uncombusted fuel adsorption device, wherein the control device preferably calculates the adsorption tolerance amount of the uncombusted fuel adsorption device on the basis of the exhaust gas temperature measured by the exhaust gas temperature measuring means.

Furthermore, in the above-mentioned exhaust gas purification system, the control device calculates a release amount of uncombusted fuel for the lean state after suspending the rich control. The control device is configured to successively subtract the release amount from the cumulative adsorption amount, and when the cumulative adsorption amount after subtraction becomes smaller than a predetermined adsorption amount for judgment, the control device resumes the rich control. In this case, it is further preferable to provide exhaust gas temperature measuring means that measures the temperature of exhaust gas flowing into the uncombusted fuel adsorption device, wherein the control device preferably calculates the release amount of uncombusted fuel from the uncombusted fuel adsorption device on the basis of the exhaust gas temperature measured by the exhaust gas temperature measuring means.

Using these configurations, the above exhaust gas purification method can be embodied, and similarly, the advantages of EGR cooler clogging prevention can be achieved. Furthermore, particularly significant advantages can be achieved in the case where the exhaust gas purification device is provided with at least one of a NOx occlusion-reduction catalyst, a NOx direct reduction type catalyst, and a diesel particulate filter.

According to the exhaust gas purification method and exhaust gas purification system of the present invention, the following advantages can be achieved. During rich control, highly dense, uncombusted fuel supplied to the exhaust gas is adsorbed by an uncombusted fuel adsorption device positioned anterior to an EGR cooler, the uncombusted fuel adsorption device being formed using an HC adsorbing agent such as zeolite, silica, or similar material. For this reason, the uncombusted fuel ceases to act as a binder for soot, and thus soot, now in a dry state, does not accumulate midway at the EGR cooler, but instead reaches the interior of the engine, where the soot is purified by combustion. Consequently, the uncombusted fuel can be prevented from acting as a binder that causes soot to adhere to the EGR cooler. As a result, clogging of the EGR cooler can be prevented, and NOx can be efficiently lowered while also preventing the worsening of fuel consumption during the rich control with a high EGR rate.

DETAILED DESCRIPTION OF EMBODIMENTS

Hereinafter, embodiments of the exhaust gas purification method and exhaust gas purification system in accordance with the present invention will be described with reference to the accompanying drawings, taking by way of example an exhaust gas purification device provided with a NOx occlusion-reduction catalyst. It should be appreciated that the rich control herein includes both a NOx regeneration control for recovering the NOx occluding ability of NOx occluding substances, as well as a sulfur regeneration control that purges sulfur from the catalyst to counter sulfur poisoning of the catalyst due to sulfur components in the fuel.

Figure 1:
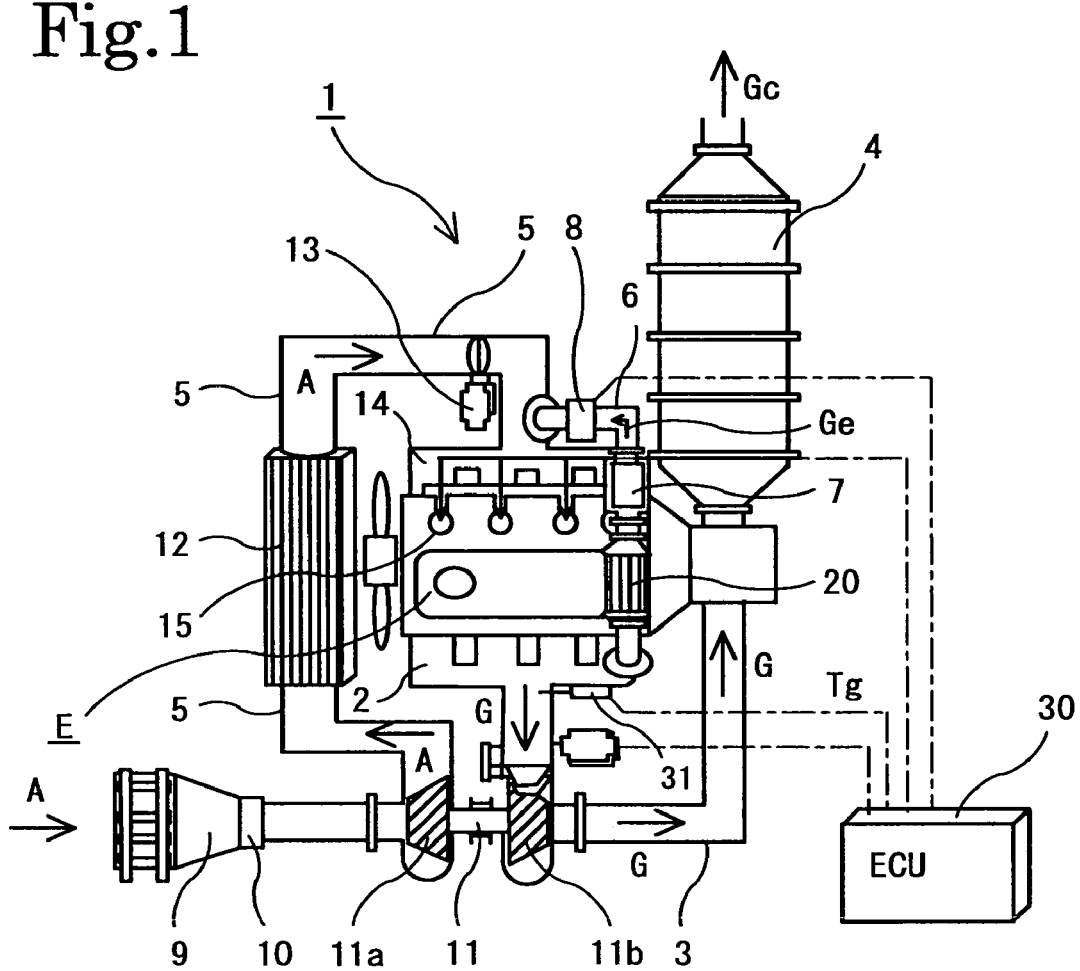
FIG. 1 is a diagram showing the configuration of an embodiment of an exhaust gas purification system in accordance with the present invention.

FIG. 1 shows the configuration of a NOx purification system 1 of an embodiment of the present invention. In this NOx purification system 1, an exhaust gas purification device (catalytic converter) 4 is disposed in the exhaust passage 3 of an engine (internal combustion engine) E, the exhaust gas purification device 4 being provided with an oxidation catalyst and a NOx occlusion-reduction catalyst.

The oxidation catalyst is formed by having a catalyst coat layer carry catalytically active components on the surface of a honeycomb support body made from cordierite or heat-resistant steel. The catalyst coat layer is formed using activated aluminum oxide ($Al_2O_3$) or a similar substance. The catalytically active components are formed from noble metals such as platinum (Pt), palladium (Pd), and rhodium (Rh). The oxidation catalyst is disposed on the upstream side inside the exhaust gas purification device 4. The oxidation catalyst oxidizes substances such as HC and CO in inflowing exhaust gas, thereby bringing the exhaust gas to a low-oxygen state while also raising the exhaust temperature as a result of combustion heat.

The NOx occlusion-reduction catalyst is configured having a metal catalyst and NOx occluding material (NOx occluding substance) carried on a catalyst coat layer provided on the monolith catalyst. The monolith catalyst is formed using cordierite, silicon carbide (SiC), or ultra-thin stainless steel foil. The monolith catalyst support body of such structural material has a large number of cells. The catalyst coat layer provided on the inner walls of these cells has a large surface area, thereby raising catalytic efficiency with the exhaust gas. The catalyst coat layer is formed using aluminum oxide ($Al_2O_3$), titanium oxide (TiO), or similar material. The metal catalyst is formed using platinum (Pt), palladium (Pd), or a similar metal. The NOx occluding material is formed using barium (Ba) or a similar element. The NOx occlusion-reduction catalyst is disposed on the downstream side inside the exhaust gas purification device 4.

In this NOx occlusion-reduction catalyst, when the exhaust gas is in a state of high oxygen concentration (i.e., a lean air-fuel state), the NOx occluding material occludes NOx in exhaust gas, thereby purifying NOx in the exhaust gas. When the exhaust gas is in a state of low or zero oxygen concentration (i.e., a rich air-fuel state), occluded NOx is released. And the released NOx is reduced by the catalytic action of the metal catalyst. In so doing, emission of NOx into the atmosphere is prevented.

In addition, an EGR passage 6 is provided connected to an exhaust manifold 2 and an intake passage 5. In this EGR passage 6, an EGR cooler 7 and an EGR valve 8 are provided from the upstream side.

Figure 3:
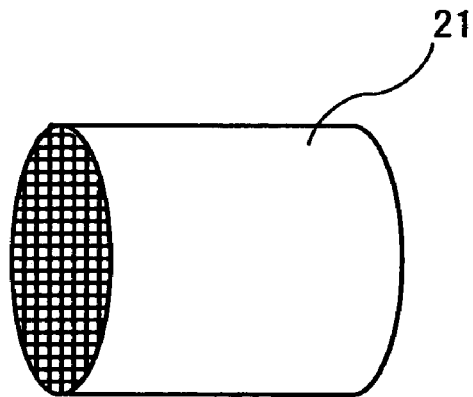
FIG. 3 is a diagram showing the catalyst support honeycomb of an uncombusted fuel adsorption device.
Figure 4:
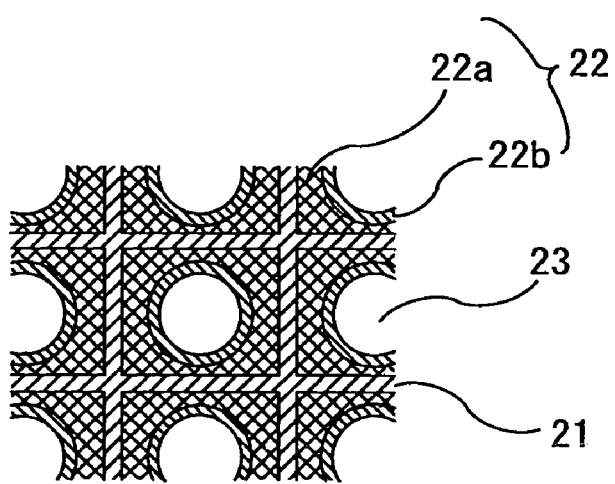
FIG. 4 is a partially enlarged schematic diagram showing the cell portion of an uncombusted fuel adsorption device.
Figure 5:
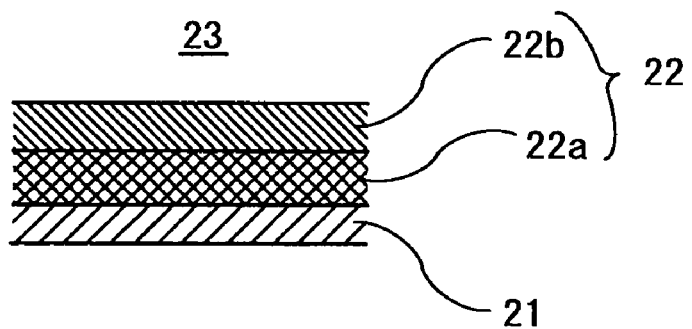
FIG. 5 is a partially enlarged schematic diagram showing the configuration of a catalyst coat layer.

In the present invention, an uncombusted fuel absorption device 20 is provided upstream to the EGR cooler 7 in the EGR passage 7. Furthermore, an exhaust gas temperature sensor 31, which detects the temperature Tg of exhaust gas flowing into the uncombusted fuel absorption device 20, is installed in the vicinity of the inlet of the EGR gas passage 6. The uncombusted fuel absorption device 20 is coated with a catalyst coat layer 22 that encloses the cells 23 that act as passages for exhaust gas G, as shown in the enlarged schematic diagrams of FIGS. 4 and 5. The cells 23 are provided on the catalyst support honeycomb 21, as shown in FIG. 3. The catalyst coat layer 22 is formed using a double catalyst coat layer made of a lower HC adsorbent layer 22a and an upper purification catalyst layer 22b. The lower HC adsorbent layer 22a is coated with an HC (hydrocarbon) adsorbing agent such as zeolite or silica. The upper purification catalyst layer 22b is coated with an HC oxidation catalyst that carries noble metals. It should be appreciated that the catalyst coat layer 22 may also be formed as a single layer of the HC adsorbent layer 22a having an HC adsorbing agent such as zeolite or silica.

Additionally, a control device (ECU: engine control unit) 30 is provided that conducts both overall control of the operation of the engine E, as well as recovery control for the NOx purification ability of the NOx occlusion-reduction catalyst 10. Loaded onto the control device 30 is a regeneration control program for recovering the purification ability of the exhaust gas purification device 4. Input into the control device 30 are the detected values from components such as an excess air ratio sensor (not shown in the drawings), an exhaust gas temperature sensor (not shown in the drawings), a load sensor (not shown in the drawings) that detects load from the state of the accelerator pedal, and a crank angle sensor (not shown in the drawings). Excess air ratio sensors are installed on the inlet side and the outlet side of the exhaust gas purification device 4 for air-fuel ratio control of the regeneration control. Exhaust gas temperature sensors are installed on the inlet side and the outlet side of the exhaust gas purification device in order to estimate the temperature of the exhaust gas purification device 4. In addition, output from the control device 30 are signals that control components of the engine E such as the intake throttle valve 13, the EGR valve 8, and the fuel injection valve 15 of a electronically controlled, common rail fuel injection device for fuel injection.

In the NOx purification system 1, air A passes through an air purifier 9 and a mass air flow sensor (MAF sensor) 10 in the intake passage 5. Subsequently, the air A is compressed by the compressor 11a of a turbocharger 11 and cooled using an intercooler 12. Subsequently, the quantity of the air A is adjusted by an intake throttle valve 13 before entering the cylinders via an intake manifold 14. Additionally, exhaust gas G generated in-cylinder flows out from the exhaust manifold 2 to the exhaust passage 3, and then enters the turbine 11b of the turbocharger 11. After driving the turbine 11b, the exhaust gas G passes through the exhaust gas purification device 4. This exhaust gas is purified by the exhaust gas purification device 4 to become purified exhaust gas Gc, which then passes through a muffler not shown in the drawings, and is exhausted into the atmosphere. In addition, a portion of the exhaust gas G is used as EGR gas Ge, which passes through the uncombusted fuel absorption device 20 and the EGR cooler 7 in an EGR passage 6. Subsequently, the quantity of the EGR gas Ge is adjusted using the EGR valve 8, and then recirculated into the intake manifold 14 from the intake passage 5.

Figure 2:
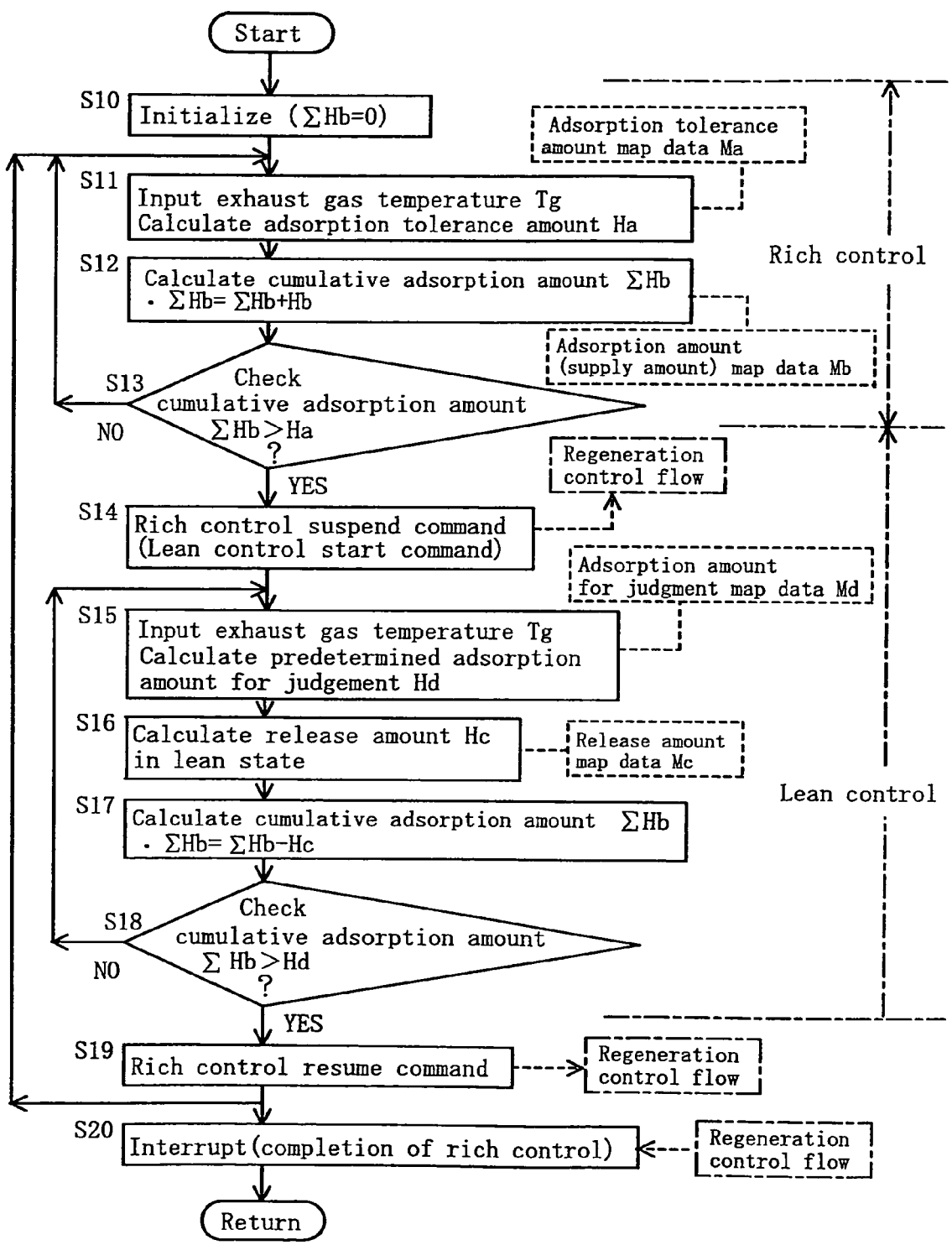
FIG. 2 is a diagram showing an exemplary control flow for enacting an embodiment of an exhaust gas purification method in accordance with the present invention.

The exhaust gas purification method of the exhaust gas purification system 1 will now be described. This exhaust gas purification method is conducted following a control flowchart like that shown in FIG. 2, for example. The control flow in FIG. 2 is illustrated as the following type of flow. When a regeneration control such as NOx regeneration control or desulfurization regeneration control of the exhaust gas purification device 4 is required, this control flow is called from a higher-level control flow. This control flow is then carried out in parallel with the regeneration control conducted by a separate regeneration control flow. This control flow returns when the regeneration control is completed, and control then reverts to the higher-level control flow.

In the rich control carried out in parallel with the control flow in FIG. 2, uncombusted fuel (HC) is supplied by means such as post injection (after injection) as part of an in-cylinder fuel injection or direct injection inside the exhaust pipe. If attempting to realize a rich state using only this fuel-related rich control wherein fuel is added, fuel consumption worsens, and drivability also worsens due to torque variations. Thus, an intake-related rich control is used in conjunction with the above. In this rich control, intake is throttled using the intake throttle valve 13, while in addition the EGR valve 8 is opened and a large amount of EGR gas is supplied. In so doing, the amount of intake air is reduced and the amount of inspired oxygen is lessened. Since well-known technology can be used for such a rich control, detailed description thereof will be omitted herein.

When the control flow in FIG. 2 is followed, in step S10, the cumulative adsorption amount $\Sigma Hb$ is initialized by being set to zero. In the subsequent step S11, the temperature Tg of exhaust gas flowing into the uncombusted fuel absorption device 20 is input, having been detected by the exhaust gas temperature sensor 31. From this exhaust gas temperature Tg, the adsorption tolerance amount Ha of the uncombusted fuel absorption device 20 is calculated, with reference to adsorption tolerance amount map data Ma that indicates the relationship between the exhaust gas temperature Tg and the adsorption tolerance amount Ha. The map data Ma is configured and input into the control device 30 in advance. In other words, adsorption tolerance amounts Ha of the uncombusted fuel absorption device 20 with respect to the exhaust gas temperature Tg are stored in the control device 30 in advance as the adsorption tolerance amount map data Ma. In addition, when switching to rich combustion, the exhaust gas temperature Tg is measured, while in addition, this measured exhaust gas temperature Tg is used to calculate an adsorption tolerance amount Ha. This adsorption tolerance amount Ha is an amount equal to or less than the maximum adsorption amount absorbable by the uncombusted fuel absorption device 20 in the exhaust gas temperature Tg. This amount is set to an amount having some margin with respect to the maximum adsorption amount, which is obtained in advance by experiment or other techniques.

In the subsequent step S12, the cumulative adsorption amount $\Sigma Hb$ is calculated, being the cumulative amount of uncombusted fuel generated by the rich combustion control that has been adsorbed by the uncombusted fuel absorption device 20. The cumulative adsorption amount $\Sigma Hb$ is calculated by first calculating the adsorption amount per unit time $\Delta Hb$ of uncombusted fuel adsorbed by the uncombusted fuel absorption device 20. The adsorption amount per unit time $\Delta Hb$ is calculated from the operational state of the engine during the rich control, as well as from the temperature Tg of exhaust gas flowing into the uncombusted fuel absorption device 20, with reference to pre-configured adsorption amount map data Mb. Alternatively, it can be assumed that the entire amount supplied to the uncombusted fuel absorption device 20 is adsorbed, and a supply amount per unit time $\Delta Hb$ of uncombusted fuel supplied to the uncombusted fuel absorption device 20 may be calculated, with reference to pre-configured supply amount map data Mb. The adsorption amount $Hb=\Delta Hb \times \Delta tb$ is calculated by multiplying the supply amount per unit time $\Delta Hb$ by the time interval $\Delta tb$ whereby the calculation is conducted. In other words, the adsorption amount per unit time $\Delta Hb$ with respect to the uncombusted fuel absorption device 20 of uncombusted fuel present in the large quantity of EGR gas as a result of the rich control is stored in advance in the control device 30. The adsorption amount Hb of the uncombusted fuel absorption device 20 is then calculated from the rich combustion time. This adsorption amount Hb is accumulated ($\Sigma Hb=\Sigma Hb+Hb$) from the commencement of the rich control to calculate the cumulative adsorption amount $\Sigma Hb$.

In the subsequent step S13, it is determined whether or not the cumulative adsorption amount $\Sigma Hb$ has exceeded the adsorption tolerance amount Ha. When $\Sigma Hb$ has not exceeded Ha, the process returns to step S11, and the rich control being conducted in parallel with this process is continued. When $\Sigma Hb$) has exceeded Ha, the process proceeds to step S14, and a suspend command is issued to the regeneration control flow for carrying out the regeneration control being conducted in parallel with the present process. In so doing, the rich control is suspended, and a lean control is conducted. In other words, control is switched from rich combustion to lean combustion.

In the subsequent step S15, the temperature Tg of exhaust gas flowing into the uncombusted fuel absorption device 20 is input, having been detected by the exhaust gas temperature sensor 31. From this exhaust gas temperature Tg, a predetermined adsorption amount for judgment Hd is calculated, with reference to adsorption amount for judgment map data Md, which indicates the relationship between the exhaust gas temperature Tg and the predetermined adsorption amount for judgment Hd. The map data Md is configured and input into the control device 30 in advance.

In the subsequent step S16, release amount Hc is calculated, being the amount of uncombusted fuel released from the uncombusted fuel absorption device 20 in the lean state after suspending the rich control. The release amount Hc is calculated by first calculating the release amount per unit time $\Delta Hc$. The release amount per unit time $\Delta Hc$ is calculated from the operational state of the engine during lean combustion, as well as from the temperature Tg of exhaust gas flowing into the uncombusted fuel absorption device 20, with reference to pre-configured release amount map data Mc. The adsorption amount Hc is then calculated by multiplying the release amount per unit time $\Delta Hc$ by the time interval $\Delta tc$ whereby this calculation is conducted. In other words, $Hc=\Delta Hc \times \Delta tc$.

In the subsequent step S17, the release amount Hc is successively subtracted from the cumulative adsorption amount $\Sigma Hb$ ($\Sigma Hb=\Sigma Hb-Hc$). In the subsequent step S18, it is determined whether or not the cumulative adsorption amount $\Sigma Hb$ after subtraction has become smaller than a predetermined adsorption amount for judgment Hd. If $\Sigma Hb$ has not become smaller than Hd, the process returns to step S15, and the lean control is continued. If $\Sigma Hb$ has become smaller than Hd, a resume command is issued in step S19 to the control flow for carrying out the regeneration control being conducted in parallel with the present process. Thus the rich control is resumed, and the process then returns to step S11.

In step S17, the release amount Hc may also be accumulated from the commencement of the lean control ($\Sigma Hc=\Sigma Hc+Hc$) to calculate a cumulative release amount $\Sigma Hc$. Then, in step S18, it may be determined whether or not the difference between the cumulative adsorption amount $\Sigma Hb$ and the cumulative release amount $\Sigma Hc$ ($\Sigma Hb-\Sigma Hc$) has become smaller than the predetermined adsorption amount for judgment Hd.

The steps S11 to S13, S15 to S18, or S11 to S19 are then repeated. When a rich control completion command is received from a higher-level control flow or a rich control flow being conducted in parallel with this repetition, the interrupt of step S20 occurs and the process returns, thereby reverting to the higher-level control flow. In so doing, the control flow in FIG. 2 is terminated. Subsequently, the control flow in FIG. 2 is repeatedly followed along with the rich control flow every time the rich control becomes necessary in the regeneration control.

According to the exhaust gas purification method following the above control flow of FIG. 2, uncombusted fuel in exhaust gas that passes through the EGR passage 6 during the rich control can be adsorbed by the uncombusted fuel adsorption device 20 provided upstream to the EGR cooler 7. Consequently, the uncombusted fuel can be prevented from acting as a binder that causes soot to adhere to components such as the EGR cooler 7, and thus clogging of the EGR cooler 7 can be prevented.

Furthermore, a release amount Hc of uncombusted fuel released in the lean state after suspension of the rich control is calculated. This release amount Hc is successively subtracted from the cumulative adsorption amount $\Sigma Hb$. And when the cumulative adsorption amount $\Sigma Hb$ after subtraction has become smaller than a predetermined adsorption amount for judgment Hd, the rich control can be resumed. In so doing, each rich control can be fully completed. For this reason, the interval between rich controls when resuming becomes a smaller amount of time compared to that of the control that waits until the next rich control is requested. Consequently, the amount of fuel consumed to raise the temperature of the exhaust gas purification device 4 can be lessened, and thus fuel consumption can be lessened.

Consequently, according to the exhaust gas purification method and the exhaust gas purification system 1 having the above configuration, highly dense, uncombusted fuel supplied to the exhaust gas G during the rich control is adsorbed by the uncombusted fuel adsorption device 20 upstream to the EGR cooler 7. For this reason, the uncombusted fuel ceases to act as a binder for soot, and thus soot, now in a dry state, does not accumulate midway at the EGR cooler 7, but instead reaches the interior of the engine, where the soot is purified by combustion. Consequently, the uncombusted fuel can be prevented from acting as a binder that causes soot to adhere to the EGR cooler, and thus clogging of the EGR cooler can be prevented. As a result, NOx can be efficiently lessened, while also preventing the worsening of fuel consumption during the rich control with a high EGR rate.

It should be appreciated that while in the foregoing description an exhaust gas purification device having a NOx occlusion-reduction catalyst was given by way of example, the present invention is not particularly limited thereto. The present invention may also be applied to exhaust gas purification systems provided with an exhaust gas device having components other than a NOx occlusion-reduction catalyst, such as a NOx direct reduction type catalyst or a continuous regeneration DPF device. This is because in a NOx direct reduction type catalyst, lean-state NOx is directly reduced, while in the rich state, a rich control is conducted to regenerate the catalyst and recover NOx reducing ability. Also, in a continuous regeneration DPF device, a rich control is conducted in order to eliminate by combustion soot (PM) trapped at the filter.

The exhaust gas purification method and exhaust gas purification system of the present invention, having the excellent advantages described in the foregoing, can be put to highly effective use with respect to an exhaust gas purification system installed in an internal combustion engine mounted onboard an automobile, the exhaust gas purification system provided with an exhaust gas purification device that purifies exhaust gas when the air-fuel ratio of the exhaust gas is in a lean state, and recovers purification ability when in a rich state.

What is claimed is:

1. An exhaust gas purification method for purifying exhaust gas when an air-fuel ratio of the exhaust gas is in a lean state, and recovering purification ability when in a rich state, comprising:
    conducting a rich control by conducting EGR and by supplying uncombusted fuel to the exhaust gas, so that the air-fuel ratio in the exhaust gas is brought to be in the rich state,
    adsorbing on an upstream side of an EGR cooler the uncombusted fuel in the exhaust gas that passes through an EGR passage during the rich control;
    calculating a cumulative adsorption amount of the uncombusted fuel adsorbed on the upstream side of the EGR cooler; and
    determining whether or not the cumulative adsorption amount has exceeded an adsorption tolerance amount of the uncombusted fuel adsorbed on the upstream side of the EGR cooler; and if the cumulative adsorption amount has exceeded the adsorption tolerance amount, terminating the rich control.

2. The exhaust gas purification method according to claim 1, wherein, further comprising:
    calculating a release amount of the uncombusted fuel in the lean state after terminating the rich control;
    successively subtracting the release amount from the cumulative adsorption amount; and
    resuming the rich control when the cumulative adsorption amount after subtraction has become smaller than a predetermined adsorption amount for judgment.

3. The exhaust gas purification method according to claim 1, further comprising providing in the exhaust gas passage at least one of a NOx occlusion-reduction catalyst, a NOx direct reduction type catalyst, and a diesel particulate filter.

4. The exhaust gas purification method according to of claim 2, further comprising providing in the exhaust gas passage at least one of a NOx occlusion-reduction catalyst, a NOx direct reduction type catalyst, and a diesel particulate filter.

5. The exhaust gas purification method according to claim 1, further comprising:
    measuring a temperature of the exhaust gas at an inlet of the EGR passage, and
    calculating the adsorption tolerance amount on the basis of the temperature.

6. An exhaust gas purification system, comprising:
    an exhaust gas purification device in an exhaust passage of an internal combustion engine for purifying exhaust gas when an air-fuel ratio of the exhaust gas is in a lean state, and recovering purification ability when in a rich state, a control device that conducts a rich control by conducting EGR and by supplying uncombusted fuel to the exhaust gas, so that the air-fuel ratio in the exhaust gas is brought to be in the rich state; and
    an uncombusted fuel adsorption device provided upstream of an EGR cooler for adsorbing the uncombusted fuel in the exhaust gas that passes through an EGR passage during the rich control,
    wherein the control device calculates a cumulative adsorption amount of the uncombusted fuel adsorbed on the upstream side of the EGR cooler, determines whether or not a cumulative adsorption amount of the uncombusted fuel adsorbed on the upstream side of the EGR cooler has exceeded an adsorption tolerance amount of the uncombusted fuel adsorbed on the upstream side of the EGR cooler and, if the cumulative adsorption amount exceeds the adsorption tolerance amount, terminates the rich control.

7. The exhaust gas purification system according to claim 6, wherein the control device
    calculates a release amount of the uncombusted fuel in the lean state after terminating the rich control,
    successively subtracts the release amount from the cumulative adsorption amount, and
    resumes the rich control when the cumulative adsorption amount after subtraction has become smaller than a predetermined adsorption amount for judgment.

8. The exhaust gas purification system according to claim 6, wherein
    the exhaust gas purification device is provided with at least one of a Nox occlusion-reduction catalyst, a NOx direct reduction type catalyst, and a diesel particulate filter.

9. The exhaust gas purification system according to claim 7, wherein the exhaust gas purification device is provided with at least one of a NOx occlusion-reduction catalyst, a NOx direct reduction type catalyst, and a diesel particulate filter.

10. The exhaust gas purification system according to claim 6, further comprising:
   a temperature sensor at an inlet of the EGR passage to detect a temperature of the exhaust gas flowing into the uncombusted fuel adsorption device.

11. An exhaust gas purification method for an exhaust gas purification device in an exhaust passage of an internal combustion engine, the exhaust gas purification device purifying exhaust gas when an air-fuel ratio of the exhaust gas is in a lean state, and recovering purification ability when in a rich state, comprising:
   as part of a rich control for bringing the air-fuel ratio of the exhaust gas to the rich state, a fuel-related rich control that supplies uncombusted fuel to the exhaust gas, and an intake-related rich control that includes EGR;
   adsorbing the uncombusted fuel in the exhaust gas that passes through an EGR passage during the rich control, using an uncombusted fuel adsorption device provided upstream to an EGR cooler;
   calculating an adsorption tolerance amount of the uncombusted fuel adsorption device and a cumulative adsorption amount of the uncombusted fuel adsorbed at the uncombusted fuel adsorption device; and
   determining whether or not the cumulative adsorption amount has exceeded the adsorption tolerance amount, and if so, the rich control is terminated.

12. The exhaust gas purification method according to claim 11, wherein, further comprising:
   calculating a release amount of the uncombusted fuel in the lean state after terminating the rich control;
   successively subtracting the release amount from the cumulative adsorption amount; and
   resuming the rich control when the cumulative adsorption amount after subtraction has become smaller than a predetermined adsorption amount for judgment.

13. The exhaust gas purification method according to claim 11, further comprising providing in the exhaust gas passage at least one of a NOx occlusion-reduction catalyst, a NOx direct reduction type catalyst, and a diesel particulate filter.

14. The exhaust gas purification method according to of claim 12, further comprising providing in the exhaust gas passage at least one of a NOx occlusion-reduction catalyst, a NOx direct reduction type catalyst, and a diesel particulate filter.

15. The exhaust gas purification system according to claim 11, further comprising:
   a temperature sensor at an inlet of the EGR passage to detect a temperature of the exhaust gas flowing into the uncombusted fuel adsorption device.

16. An exhaust gas purification system, comprising:
   an exhaust gas purification device in an exhaust passage of an internal combustion engine, the exhaust gas purification device purifying exhaust gas when an air-fuel ratio of the exhaust gas is in a lean state, and recovering purification ability when in a rich state;
   a control device that conducts, as part of a rich control for bringing the air-fuel ratio of the exhaust gas to the rich state, a fuel-related rich control that supplies uncombusted fuel to the exhaust gas, and an intake-related rich control that includes EGR;
   an uncombusted fuel adsorption device upstream of an EGR cooler, the uncombusted fuel adsorption device adsorbing the uncombusted fuel in the exhaust gas that passes through an EGR passage during the rich control, calculates an adsorption tolerance amount of the uncombusted fuel adsorption device and a cumulative adsorption amount of the uncombusted fuel adsorbed at the uncombusted fuel adsorption device, and
   determines whether or not the cumulative adsorption amount has exceeded the adsorption tolerance amount, and if so, terminates the rich control.

17. The exhaust gas purification system according to claim 16, wherein the control device
   calculates a release amount of the uncombusted fuel in the lean state after terminating the rich control,
   successively subtracts the release amount from the cumulative adsorption amount, and
   resumes the rich control when the cumulative adsorption amount after subtraction has become smaller than a predetermined adsorption amount for judgment.

18. The exhaust gas purification system according to claim 16, wherein the exhaust gas purification device is provided with at least one of a NOx occlusion-reduction catalyst, a NOx direct reduction type catalyst, and a diesel particulate filter.

19. The exhaust gas purification system according to claim 17, wherein the exhaust gas purification device is provided with at least one of a NOx occlusion-reduction catalyst, a NOx direct reduction type catalyst, and a diesel particulate filter.

20. The exhaust gas purification system according to claim 16, further comprising:
   a temperature sensor at an inlet of the EGR passage to detect a temperature of the exhaust gas flowing into the uncombusted fuel adsorption device.

* * * * *